United States Patent
Krueger

(10) Patent No.: US 6,680,740 B2
(45) Date of Patent: Jan. 20, 2004

(54) DYNAMIC SELECTION OF DATA FORMAT CONVERSION PATHS

(75) Inventor: Sharon A. Krueger, Webster, NY (US)

(73) Assignee: Xerox Corporation, Stamford, CT (US)

(*) Notice: Subject to any disclaimer, the term of this patent is extended or adjusted under 35 U.S.C. 154(b) by 319 days.

(21) Appl. No.: 09/849,234

(22) Filed: May 7, 2001

(65) Prior Publication Data
US 2002/0180755 A1 Dec. 5, 2002

(51) Int. Cl.$^7$ .................................................. G09G 5/02
(52) U.S. Cl. ......................................... 345/601; 345/604
(58) Field of Search .............................. 345/590, 600, 345/601, 602–604

(56) References Cited

U.S. PATENT DOCUMENTS 5,432,906 A  7/1995 Newman et al.
6,108,008 A * 8/2000 Ohta .......................... 345/590

* cited by examiner

Primary Examiner—Matthew Luu
(74) Attorney, Agent, or Firm—Oliff & Berridge, PLC

(57) ABSTRACT

A data processor identifies a source format and a destination format of data. The data processor determines whether a fast data conversion path, such as a direct lookup table, is available to convert one or more portions of the data from the source format to the destination format, and converts the data using the fast data conversion path where possible. For portions of the data not convertible by a fast data conversion path, the data processor performs a two-step conversion process in which the data is first converted from the source format to an intermediate format and then from the intermediate format to the destination format.

25 Claims, 6 Drawing Sheets

DYNAMIC SELECTION OF DATA FORMAT CONVERSION PATHS

BACKGROUND OF THE INVENTION

1. Field of Invention

This invention relates to format conversion of data.

2. Description of Related Art

In general, color processing is a two-step process. Input data in a device-dependent color space is translated into device-independent data, which is in turn translated to a device-dependent color space appropriate to an output device, such as a printer.

When there is only one possible data source and one possible data destination, a direct lookup table may be provided to convert the data directly from the source format to the destination format. However, in a situation with a plurality of possible data sources and/or a plurality of possible data destinations, it would be infeasible to provide a direct lookup table for every possible combination of data source and data destination.

SUMMARY OF THE INVENTION

This invention improves performance of data conversion by providing systems and methods in which at least one fast data conversion path is provided.

A determination is made as to whether a fast data conversion path is available for a specified source-to-destination data conversion. A fast data conversion path is used if available; otherwise, a two-step conversion process is used.

In various exemplary embodiments, the fast data conversion path is implemented using a lookup table (LUT). In one aspect of the invention, a lookup table converts data from a first data format associated with a particular type of data source to a second data format associated with a particular type of data destination. Data is received, the source format of the data is identified, if possible, and a destination format of the data is identified. If the data received is in the first format and the destination that the data will be output to uses the second format, the received data is directly converted from the first format to the second format using the lookup table.

If it is determined that the received data is not in the first format and/or that the destination format of the data is not the second format, the data is converted from the first format to an intermediate format. Then the intermediate format data is converted to a third format associated with the identified destination.

In another aspect, the systems and methods according to this invention determine whether color adjustment is to be performed to the data. If color adjustment is to be performed, the fast data conversion path cannot be used. Therefore, the two-step conversion process is used without regard to whether there is a first data conversion path.

These and other features and advantages of this invention are described in, or are apparent from, the following detailed description of various exemplary embodiments of the systems and methods according to this invention.

DETAILED DESCRIPTION OF EXEMPLARY EMBODIMENTS

Figure 1:
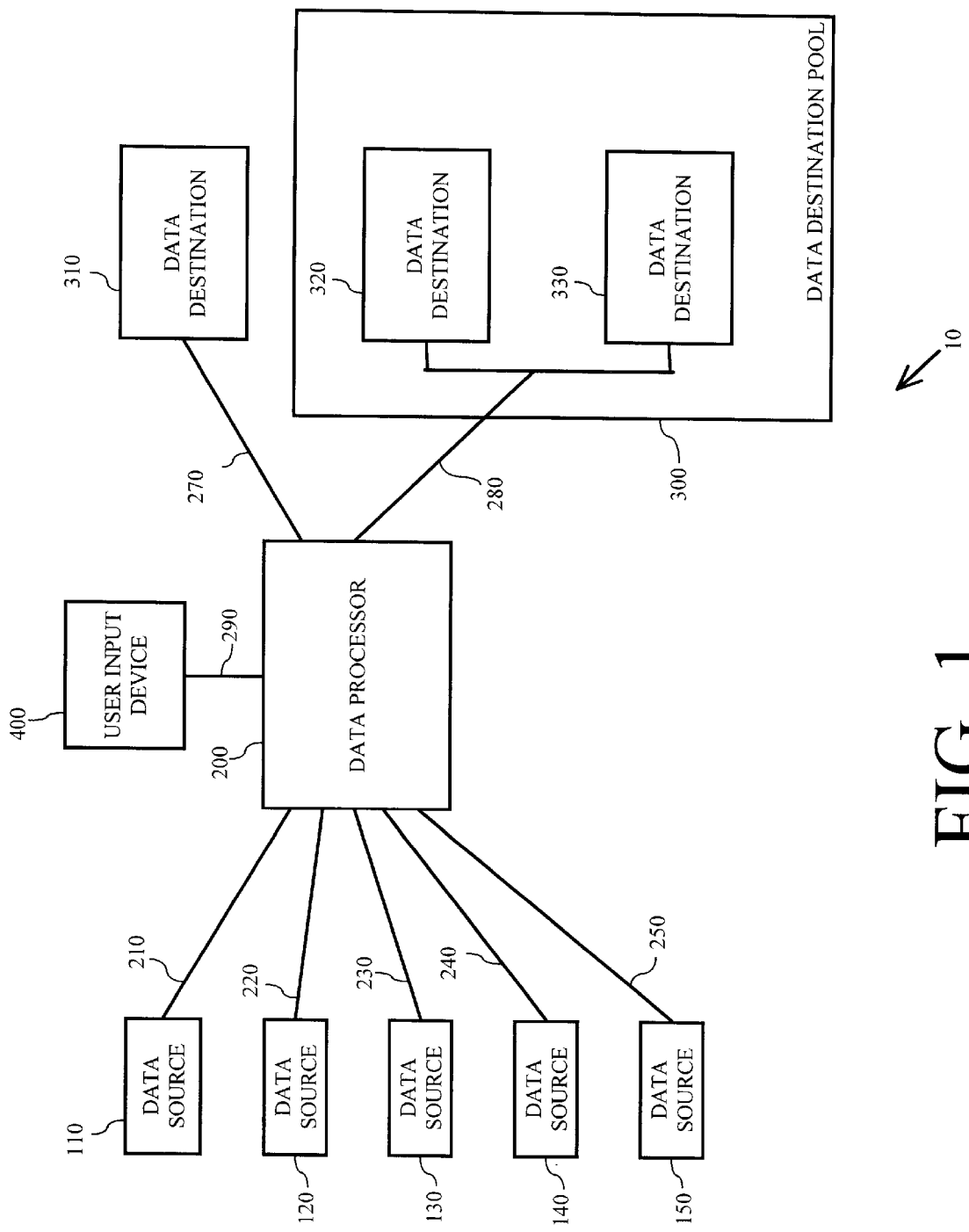
FIG. 1 is a functional block diagram of one exemplary embodiment of a data processing system according to this invention.

The systems and methods according to this invention improve performance of data conversion by providing at least one fast data conversion path. The at least one fast data conversion path can be implemented using at least one direct lookup table. A determination is made as to whether a fast data conversion path is available for a specified source-to-destination data conversion. If available, such a fast data conversion path is used. Otherwise, a two-step conversion process is used.

A data source may be any device or location at which data is generated and/or from which data is supplied. Data may be provided in different categories, e.g., images, graphics, or text. Thus, data sources may include, for example, scanners and digital cameras, for image data; vector graphics computer programs, Computer Aided Drafting (CAD) programs, or the like, for graphics data such as pie charts, flow charts, computer aided drawings, etc.; and word processing programs, for text data. Data sources can also include storage devices where previously-generated document or image files are stored.

Data sources may be defined in terms of a device-dependent color space, such as RGB, CMYK, or the like, used by a data generation device.

A single document, or set of data, may include only data created at a single source, or may include data from more than one data source. For example, a single document may contain a scanned image, text, and a graphic, each created at a different source.

A data destination may be any device or location at which data is output in visible or tangible form or stored for later output in its converted format. For example, a data destination may be a display device such as a monitor, a liquid crystal display or the like, or a marking engine such as a printer. Data destinations may therefore be defined in terms of a device-dependent color space, such as RGB, CMYK, or the like, used by an output device.

A data destination may be further defined as a particular set of output parameters at an output device or location. For example, various types of marking substrates may be used in a single marking engine, with different colors, weights, coatings, opacity, white point (the degree of whiteness), or the like. Thus, the marking substrate color, weight, coating, opacity, and white point may be used as output parameters.

As another example, the marking engine may be set to emulate another output device, and the specified emulation may be used as an output parameter. As another example, various rendering intents may be specified, and the specified rendering intent may be used as an output parameter. Examples of rendering intents include "perceptual," "saturation," "absolute colorimetric," and "relative colorimetric", all specified by the International Color Consortium (ICC), and "pure," specified by Xerox Corporation. As is known by those skilled in the art, each rendering intent specifies an enhancement used for a particular context. For example, "perceptual" makes photograph images more lifelike, "saturation" makes colors brighter and is useful to enhance the look of pie charts, etc., and so forth.

A data conversion that is appropriate for marking on a white paper substrate with a gloss coating, with a "saturation" rendering intent, for example, may not be appropriate for marking on a yellow paper substrate with no coating, with an "absolute colorimetric" rendering intent, or for marking on a transparent plastic substrate. Thus, for example, one data destination may be defined as the set of parameters of "marking engine A, white paper, gloss coating, saturation"; another data destination may be defined as the set of parameters of "marking engine A, yellow paper, no coating, absolute calorimetric"; a third data destination may be defined as the set of parameters of "marking engine B, set to emulate marking engine C, transparent plastic substrate, pure"; a fourth data destination may be defined as the set of parameters of "display device A, perceptual"; and so forth.

It should also be appreciated that different sets of output parameters may be specified for different parts of the same collection of data. For example, different rendering intents may be specified for different parts of the same document. For example, if a document contains a photographic image, a pie chart, and text, the "perceptual" rendering intent may be specified for the photographic image portion of the data, the "saturation" rendering intent may be specified for the pie chart portion of the data, and the "pure" rendering intent may be specified for the text portion of the data.

FIG. 1 is a functional block diagram of one exemplary embodiment of a data processing system 10 according to this invention. The system may include plurality of data sources 110, 120, 130, 140, 150 and 160 connected to a data processor 200. A data destination 310, a data destination pool 300, which includes data destinations 320 and 330, and a user input device 400 are also connected to the data processor 200.

The data sources 110–150, the data destination 310, the data destination pool 300 and the user input device 400 are connected to the data processor 200 via links 210–290, respectively. The links 210–290 can be any known or later developed devices or systems for connecting the data sources 110–150, the data destination 310, the data destination pool 300 and the user input device 400 respectively to the data processor 200, including direct cable connections, connections over a wide area network or a local area network, connections over an intranet, connections over the Internet, or connections over any other distributed processing network or system. In general, the links 210–290 can be any known or later developed connection system or structure usable to connect the data sources 110–150, the data destination 310, the data destination pool 300 and the user input device 400 respectively to the data processor 200.

The data destinations 310–330 may represent different output devices or locations, and/or different sets of output parameters at the same output device or location. For example, the data destination 310 may represent a marking engine or a display device. The data destinations 320 and 330 within the data destination pool 300 may represent different sets of output parameters at one output device or location. For example, the data destination pool 300 may be a marking engine, and the data destinations 320 and 330 may represent different sets of output parameters under which the marking engine may perform marking.

It should be appreciated that when a collection of data is sent to the data destination pool 300, different parts of the data may be sent to different destinations within the data destination pool 300. For example, for a document that contains text, a photographic image and a pie chart, the "perceptual" rendering intent may be specified for the photographic image portion of the data, the "saturation" rendering intent may be specified for the pie chart portion of the data, and the "pure" rendering intent may be specified for the text portion of the data, as discussed above. In this case, each different portion of the data has a different destination within the data destination pool 300 (a marking engine in this case), even though there is only one ultimate output by the data destination pool 300. In this case, the separate parts of the data should be separately tagged at the data source, or otherwise differentiated during processing. QuarkXPress 4.04 is an example of a known program that allows tagging of different parts of a collection of data.

While a plurality of possible data sources and a plurality of possible data destinations are shown, it should be appreciated that this invention is also useful in a configuration with a plurality of possible data sources and only one or a few possible data destinations, or in a configuration with only one or a few possible data sources and a plurality of possible data destinations.

The user input device 400 allows a user to input desired output parameters, and may also allow the user to input other relevant information. For example, if the data source of a particular file is not indicated by the data, e.g., if the data does not contain source device identification in a header or the like, but the user happens to know which device created the data, and/or the input color space, the user can input this information via the user input device. This additional information can improve the accuracy of data format conversion by the data processor 200. The user input device 400 may include or be part of any suitable device such as a Graphical User Interface (GUI), keyboard, mouse, etc.

The user input device 400 may also be used to request information from the data sources 110–150. For example, if the data source 120 is a web site on the World Wide Web, a user may input a request via the user input device 400 for data to be downloaded from the web site. Thus, it should be appreciated that data can be "pushed" into the data processor 200 from the data sources 110–150, or "pulled" into the data processor 200 from the data sources 110–150.

In some embodiments of the invention, the user input device 400 may not be necessary. For example, the user may input the desired output parameters and/or other information at the data source at which the data is generated. For example, if a user creates a document on data source 110, the user may, via the data source 110, input the desired output parameters and/or other information, such as the input color space, via the program or application used to create the document, or via the tools used to send the document data to the data processor 200. Some of the information may be automatically incorporated into the data, such as the input color space and/or other characteristics of the data source 110.

It is also possible to not require any input of some information, such as the input color space. In this case, the data processor 200 would simply perform the best format conversions possible based on the available information. For example, if the input color space of a set of data were not known, the data processor 200 would perform the format conversion based on default values.

Various exemplary embodiments of the systems and methods according to this invention include the user input device 400 to allow users to set various output and/or input parameters, but also include an option of operating at default values when the user does not specify output and/or input parameters. This allows experienced users the flexibility to input or modify parameters as desired to obtain optimal results, but also allows novice users to get good results even without extensive knowledge or skill.

While FIG. 1 shows the data processor 200 as a separate device from the data sources 110–150, the data processor 200 may be an integrated device, such as a digital copier, a computer with a built-in printer, or any other integrated device that is capable of producing a hard copy image output. With such a configuration, for example, the data source 110, 120, 130, 140 and/or 150, the data processor 200, the data destination 310, 320 and/or 330, and the user input device 400 may be contained within a single device. For example, in the case of a digital copier, only one data source 110, 120, 130, 140 or 150 may be present, and this data source 110, 120, 130, 140 or 150 would correspond to the scanning portion of the digital copier. Each data destination 310–330 may correspond to a different set of output parameters using the image output portion of the digital copier. In the case of a computer with a built-in printer, the data sources 110–150 may all be present, with only one of the data destinations 310–330 present. The data sources 110–150 may correspond to different data-creating programs installed on the computer, and the data destination 310, 320 or 330 may correspond to a single set of output parameters on a single printer.

Alternatively, the data processor 200 may be a separate device containing the user input device 400 attachable upstream of a stand alone output destination 310, 320 or 330. For example, the data processor 200 may be a device which interfaces with both the data source 110, 120, 130, 140 and/or 150 and the data destination 310, 320 and/or 330. For example, the data processor 200 may be incorporated into a network print server that manages printer data for a plurality of the same or different printer devices.

Furthermore, the data processor 200 may be implemented as software on the data source 110, 120, 130, 140 and/or 150 or on a computer separate from the data source 110, 120, 130, 140 and/or 150. Other configurations of the elements shown in FIG. 1 may be used without departing from the spirit and scope of this invention.

Figure 2:
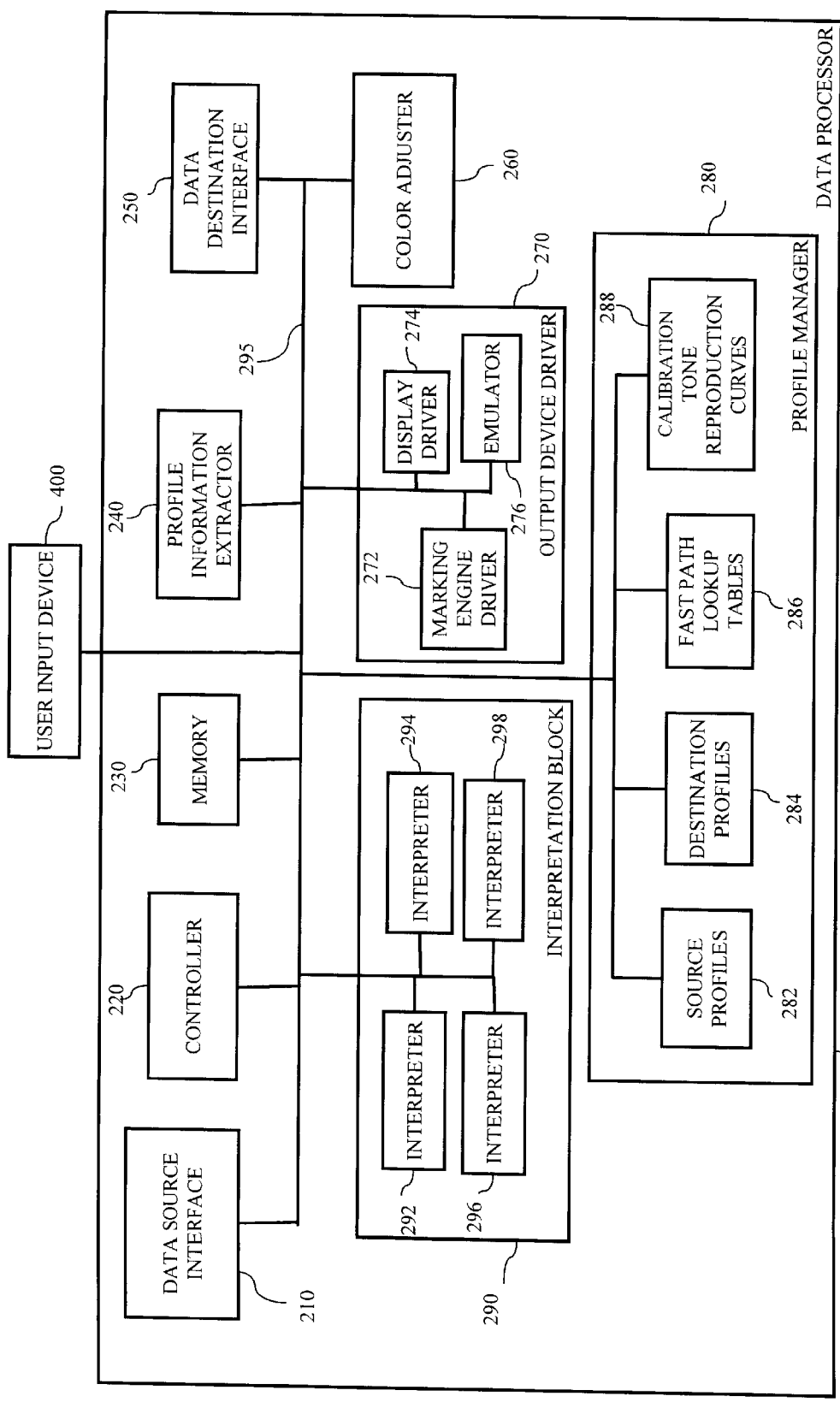
FIG. 2 is a functional block diagram of one exemplary embodiment of a data processor according to this invention.

FIG. 2 is a functional block diagram showing one exemplary embodiment of the data processor 200. The data processor 200 includes a data source interface 210, a controller 220, a memory 230, a profile information extractor 240, a destination interface 250, a color adjuster 260, an output device driver 270, a profile manager 280, and an interpretation block 290, all of which are interconnected by a data/control bus 295. The user input device 400 is also connected to the bus 295, either directly or through the data source interface 210 or some other interface (not shown).

The interpretation block 290 includes interpreters 292, 294, 296 and 298. The interpreters 292, 294, 296 and 298 analyze data received from the data sources 110, 120, 130, 140, 150 and 160 via the data source interface 210 and determine what parts of the incoming data need to be processed. For example, the interpreters 292, 294, 296 and 298 analyze Page Description Language (PDL) files. Examples of known PDLs include PostScript, TIFF, PDF and PCL (e.g., PCL5C and PCL5E). Thus, for example, the interpreter 210 may be a PostScript interpreter, the interpreter 220 may be a TIFF interpreter, the interpreter 230 may be a PDF interpreter, and the interpreter 240 may be a PCL interpreter.

The profile manager 290 may include source profiles 282, destination profiles 284, fast data conversion path lookup tables 286, calibration tone reproduction curves 288, and/or any other information necessary for converting data formats.

Source profiles 282 define the characteristics of the source format in which data was created, and are used to translate device-dependent data, i.e., data in the format in which it was created, into device-independent space. Known examples of source profiles 282 include source ICC profiles (defined by the International Color Consortium), including both input ICC profiles and display ICC profiles. ICC profiles are applicable for PDF and TIFF, for example. Other known examples of source profiles 282 are Color Space Dictionaries (CSDs), which are a resource available for PostScript. Other known examples of source profiles 282 are Configure Image Data (CIDs), which are a resource available for PCL5C, for example.

In addition, source profiles may simply refer to the color space in which data was created, or may, for further detail, include additional information about individual sources, such as characteristics particular to certain manufacturers or models, for example. In short, any set of information that can be used to translate device-dependent data into a device-independent color space may be used as a source profile 282. Thus, other known or later developed source profiles are applicable and are within the scope of this invention.

The device-independent color space into which data is converted based on source profiles may be any known device-independent color space, such as CIELAB or XYZ, or any later developed space. The Profile Connection Space (PCS), defined by the ICC, is similar to the CIELAB color space, and is defined in terms of the colorimetry that will produce the desired color appearance if rendered on a reference imaging medium and viewed in a reference viewing environment. For the remainder of this disclosure, PCS will be used as the device-independent space into which data is converted based on source profiles. However, it should be understood that other spaces are also possible.

The destination profiles 284 are used to convert PCS data to device-independent data targeted for a specific destination or device, e.g., printer, display, etc., at which the data is to be output, either directly or at some future time after being indefinitely stored. Known examples of the destination profiles 284 include destination ICC profiles, also known as output ICC profiles. Other known examples of the destination profiles 284 are Color Rendering Dictionaries, which are a resource available for PostScript. In short, any set of information that can be used to translate a device-independent color data into a device-dependent color space may be used as a destination profile 284. Thus, other known or later developed destination profiles are applicable and are within the scope of this invention.

The fast data conversion path lookup tables 286 are used to convert device-dependent source data directly into device-dependent destination data, without going through the device independent color space, such as PCS. Converting directly from the device-dependent source data into the device-dependent destination data is faster than the two-step process of converting the device-dependent source data to PCS and then converting the device-independent data to device-dependent destination data. Therefore, the fast data conversion path lookup table is preferred if it is available. However, it is not practical to provide a fast data conversion path lookup table 286 for each possible source/destination pair. Therefore, only one or a few fast data conversion path lookup tables 286 will generally be provided as a standard feature, preferably covering the most common source/destination pairs. Users may create or otherwise obtain additional fast data conversion path lookup tables 286. These user-defined fast data conversion path lookup tables 286 can then be stored along with the standard fast data conversion path lookup table 286.

An exemplary representation of a portion of a fast data conversion path lookup table 286 is given below. This table is used for going from a two-dimensional input space (cyan and magenta) to a three-dimensional output space (red, green and blue reflectance). It will be appreciated that different tables may be used to go from any other input space, such as three-dimensional, four-dimensional, etc., to any other output space, such as two-dimensional, four-dimensional, etc.

| C | M | R | G | B | OutputColor |
|---|---|---|---|---|---|
| 0 | 0 | 255.0 | 255.0 | 255.0 | white |
| 0 | 1 | 255.0 | 220.3 | 255.0 | |
| 0 | 2 | 255.0 | 200.1 | 255.0 | |
| 1 | 0 | 222.0 | 255.0 | 255.0 | |
| 1 | 1 | 220.1 | 218.3 | 254.5 | |
| . | . | . | . | . | |
| . | . | . | . | . | |
| . | . | . | . | . | |
| 3 | 1 | 180.6 | 219.1 | 253.7 | cyanish blue |
| . | . | . | . | . | |
| . | . | . | . | . | |
| . | . | . | . | . | |

For the above table, image values of 0, 50, 100, 150, 200 and 255 from the cyan scale of 0–255 in a standard CMYK color space are the cyan nodes, and are represented in the table by the index values 0, 1, 2, 3, 4 and 5, respectively. Image values of 0, 75, 150.5 and 255 from the magenta scale of 0–255 in a standard CMYK color space are the magenta nodes, and are represented in the table by the index values 0, 1, 2 and 3, respectively. Thus, in this example, six nodes are specified for cyan and four nodes are specified for magenta. It should be appreciated that any number of nodes may be specified. The greater the number of nodes, the better the accuracy. For example, if fifty nodes were specified for cyan, the nodes may be spaced at image values of 0, 5, 10, 15, . . . , 245, 250 and 255, for example, represented in the table using the index values 0–49, respectively.

Furthermore, while the nodes in the above example are spaced out relatively uniformly along the cyan or magenta scale, respectively, it should be appreciated that they may be spaced non-uniformly. For example, if it is expected that data will include mostly darker colors and it is desired to provide better definition in the darker areas using the same total number of nodes, the nodes may be selected such that relatively fewer nodes are selected from the lighter regions of the scales, while relatively more nodes are selected from the darker regions of the scales.

The calibration tone reproduction curves 288 may be provided for self-calibration of a destination device such as a marking engine, for example, in accordance with known calibration methods.

The profile information extractor 240 determines whether any profile information is embedded within the incoming data. The profile information may be in the form of one or more complete source profiles and/or one or more complete destination profiles. Alternatively, rather than complete profiles, pointers to profiles may be included. For example, rather than including a complete source profile and/or a complete destination profile, the data may include a pointer to a source profile 282 in the profile manager 280, and/or a pointer to a destination profile 284 in the profile manager 280. In this case, the appropriate profile or profiles may be retrieved from the profile manager 280.

If source profile information is not included in the incoming data, the user may, if the user knows the source format of the incoming data, input profile information via the user input device 400. Alternatively, a "sniffer" (not shown) may be provided that analyzes the incoming data to determine the source format of the incoming data. If the source format is not known and cannot be determined, the data processor 200 may process the data without the source profile information. For example, the data processor 200 may use default values, prompt the user to input a best guess, or the like.

The controller 220 determines whether a fast data conversion path is available to process the data. For a fast data conversion path to be available, three conditions must exist: (1) both the source format and the destination format must be known, (2) a fast data conversion path lookup table usable to convert the source format to the destination format must exist, and (3) there must be no color adjustments that are not integrated into the fast data conversion path. Thus, for example, the controller 220 determines whether both the source format and the destination format are known, based on the information extracted by the profile information extractor 240, any profile information input by the user via the user device 400, any information obtained by sniffing and/or the like. The controller 220 also determines whether any color adjustments are needed, for example by detecting whether there has been any user input requesting color adjustments. If there has been any user input requesting a color adjustment, the controller 220 may determine whether the requested color adjustment is integrated into a fast data conversion path lookup table. The controller 220 may also query the profile manager 280 to determine whether an appropriate fast data conversion path lookup table exists for the determined source and destination formats.

It should be appreciated that, if the incoming data contains pointers to profiles, rather than containing complete profiles, and if the fast data conversion path lookup tables 286 are identified by corresponding information, the controller 220 may perform the determination of whether color adjustments are needed and/or the determination of whether a fast data conversion path is available before retrieving the actual profiles from the profile manager 280. For example, the controller 220 may first perform the determination of whether color adjustments are needed. If color adjustments are needed, and if the necessary color adjustments are not integrated into any available fast data conversion path, then a fast data conversion path cannot be used. Therefore, the controller 220 may skip subsequent steps that would have been performed solely for the purpose of determining whether a fast data conversion path is available. Similarly, if source profile information pointer A indicating data source 140 and destination profile information B indicating data destination 310 are extracted from incoming data, the controller 220 may scan a list of the fast data conversion path lookup tables 286 stored in the profile manager 280 and determine whether a fast data conversion path lookup table 286 exists for direct conversion from the data source 140 format to the data destination 310 format. Thus, if a fast data conversion path is available, the controller 220 may skip the needless step of retrieving the entire profiles, and any other steps that become unnecessary because of the availability of a fast data conversion path.

If a fast data conversion path is available, the controller 220 directly converts the data using the fast data conversion path. Otherwise, the controller 220 performs a two-step conversion process of (1) converting from the device-dependent source format to PCS or other device-independent format and (2) converting from PCS or other device-independent format to the device-dependent destination format. It should be appreciated that a fast data conversion path may be available for all or part of a given set of data, and that the controller 220 may, if a fast data conversion path is available for only a part of the data, process that part of the data using that fast data conversion path and process the remaining part of the data using the two-step process.

If color adjustments in the form of lightness, contrast, saturation, color cast or the like are requested by a user via the user input device 400, or if a user's color adjustment request is included with incoming data, the color adjustments are performed by the color adjuster 260. As discussed above, when color adjustments are needed, a fast data conversion path can only be used if the required color adjustments are integrated into the fast data conversion path. In this case, the color adjustments will be performed as part of the fast path, and will not be performed by the color adjuster 260.

The output device driver 270 may include one or more marking engine drivers 272, one or more display drivers 274 and an emulator 276, or any combination of these devices or software structures. After data format conversion has been performed by the controller 220, the output device driver 270 outputs the converted data to one of the data destinations 310, 320 or 330 via the data destination interface 250. If the data destination is a marking engine, the output device driver 270 outputs the data using the appropriate marking engine driver 272, along with any necessary commands to initiate or enable operation of that marking engine. If the data destination is a display device, the output device driver 270 outputs the data using the appropriate display device driver 274, along with any necessary commands to initiate or enable operation of the display device. If one output device is to be set to emulate the output of another output device, the emulator 276 transmits the information necessary for the emulation.

In addition to the functions described above, the controller 220 performs any other control needed to control the flow of data and the operations of the other components within the data processor 200.

The memory 230 may store any programs needed for operation of the data processor 200, and may, if necessary, serve as a buffer during input or output of data to or from the data processor 200, and/or during processing of the data within the data processor 200.

It should be appreciated that, if incoming data from a data source 110, 120, 130, 140 or 150 is already in the proper output format, no data conversion needs to be performed. Thus, the controller 220 may simply detect that the input format and the requested output format are identical and direct the information directly to the appropriate data destination 310, 320 or 330.

The memory 230 shown in FIG. 2 can be implemented using any appropriate combination of alterable, volatile or non-volatile memory or non-alterable, or fixed, memory. The alterable memory, whether volatile or non-volatile, can be implemented using any one or more of static or dynamic RAM, a floppy disk and disk drive, a writable or re-writeable optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

It should be understood that each of the circuits shown in FIG. 2 can be implemented as portions of a suitably programmed general purpose computer, special purpose computer, microprocessor or the like. For example, the circuits can be implemented as software executing on a programmed general purpose computer, a special purpose computer, a microprocessor or the like. In this case, the data processor 200, or any of its circuits, can be implemented as a routine embedded in a printer driver, as a resource residing on a server, or the like. The data processor 200 can also be implemented by physically incorporating it into a software and/or hardware system, such as the hardware and software systems of a printer or a digital photocopier. Alternatively, each of the circuits shown in FIG. 2 can be implemented as physically distinct hardware circuits within an ASIC, or using a FPGA, a PDL, a PLA or a PAL, or using discrete logic elements or discrete circuit elements. The particular form each of the circuits shown in FIG. 2 will take is a design choice and will be obvious and predictable to those skilled in the art.

Figure 3:
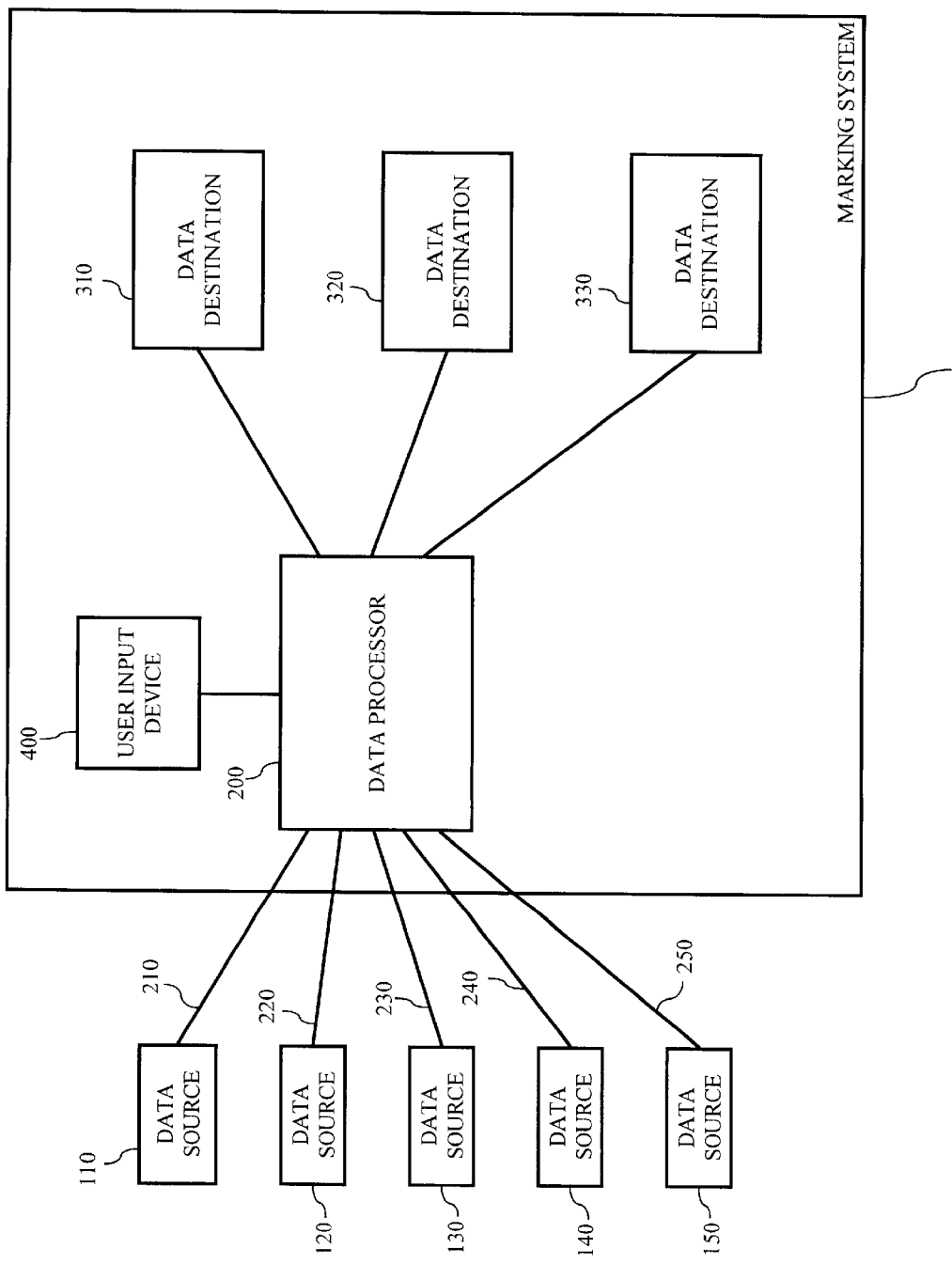
FIG. 3 is a functional block diagram of one exemplary embodiment of a marking system according to this invention.

FIG. 3 is a functional block diagram of one exemplary embodiment of a marking system 20 according to this invention. The marking system 20 includes the processor 200 of FIG. 2, and is similar to the data processing system 10 of FIG. 1 except that the data destinations 310–330 are all physical parts of the marking system 20.

Figure 4:
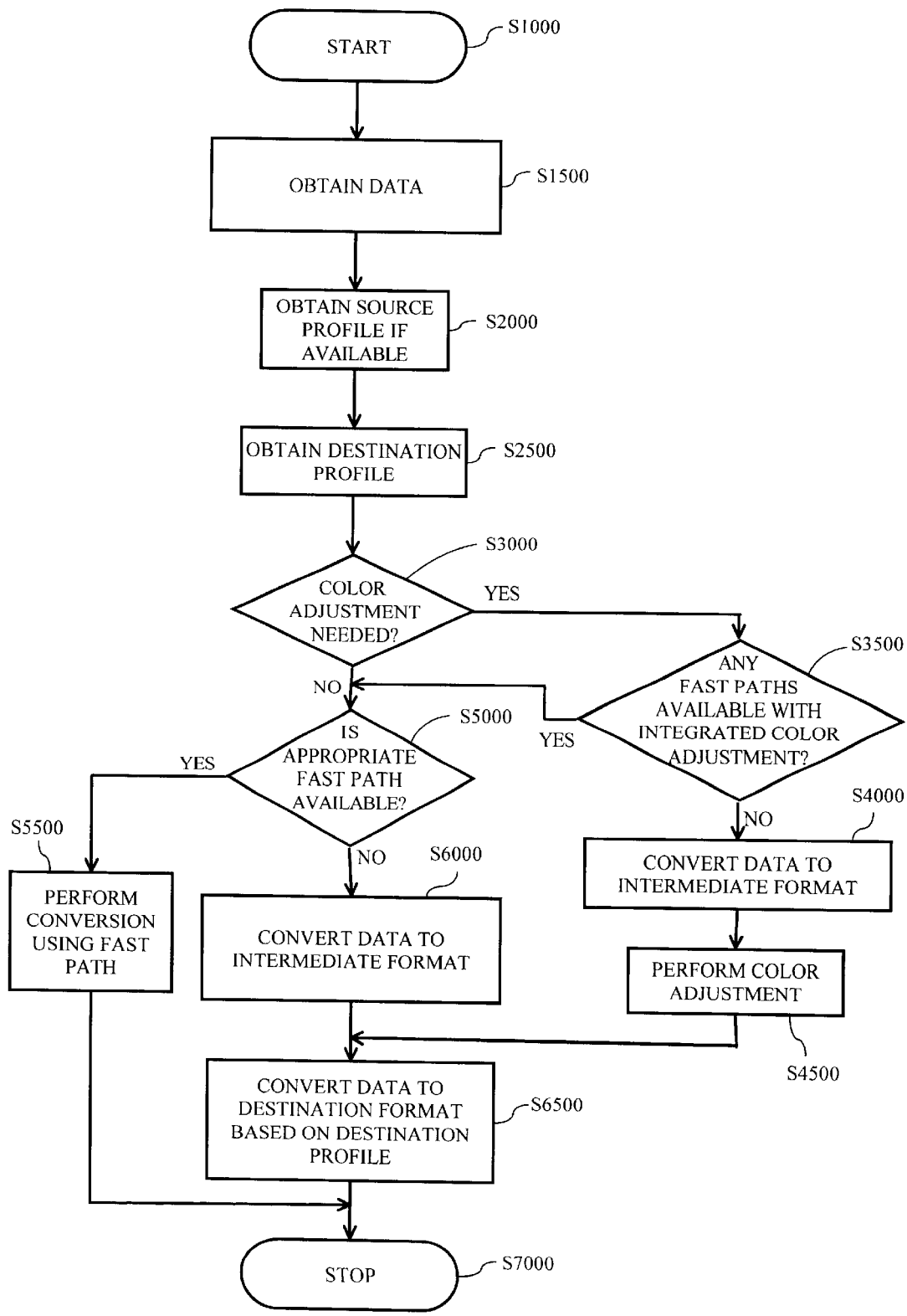
FIG. 4 is a flowchart outlining one exemplary embodiment of a method for converting data formats according to this invention.

FIG. 4 is a flowchart outlining one exemplary embodiment of a method for converting data formats according to this invention. Beginning in step S1000, control continues to step S1500, where data which is to be converted from an input format to an output format is obtained. Next, in step S2000, a source profile is obtained, if a source profile is available. Then, in step S2500, a destination profile is obtained. Control then continues to step S3000.

In step S3000, a determination is made whether color adjustment is needed. This determination is typically based on user input but can be based on any known or later developed technique for indicating that such adjustments should be made. If color adjustment is not needed, the method jumps to step S4500. Otherwise, the method continues to step S3500.

In step S3500, a determination is made whether any fast paths are available with an integrated color adjustments. If there are any such fast paths, the method jumps to step S5000. Otherwise, the method continues to step S4000. It should be appreciated that, if none of the available fast paths have integrated color adjustments, and no addition of such fast paths is contemplated, then step S3500 may be eliminated rather than having to be repeated each time the method is performed.

In step S4000, the data is converted to an intermediate format, such as Profile Connection Space (PCS), or other suitable device-independent color space. If a source profile is available, as determined previously in step S2000, this conversion is based on the source profile. Otherwise, a default conversion is performed. Then in step S4500, the requested color adjustments are performed. The method then jumps to step S6500.

In step S5000, a determination is made whether an appropriate fast data conversion path is available. This is done for example by querying a database to determine whether a direct lookup table is available for conversion from the source format to the destination format. If a color adjustment is needed, this determination will also include a determination of whether the necessary color adjustment is integrated into the direct lookup table. If a fast data conversion path is available, the method continues to step S5500. Otherwise, the method jumps to step S6000.

In step S5500, the data format conversion is performed using the fast data conversion path that was determined to be available in step S5000. The method then jumps to step S6500.

In step S6000, the data is converted to an intermediate format, such as Profile Connection Space (PCS), or other suitable device-independent color space. If a source profile is available, as determined previously in step S2000, this conversion is based on the source profile. Otherwise, a default conversion is performed. Then, in step S6500, the data is converted from the intermediate format to the destination space based on the destination profile. Finally, in step S7000, the method ends.

Figure 5:
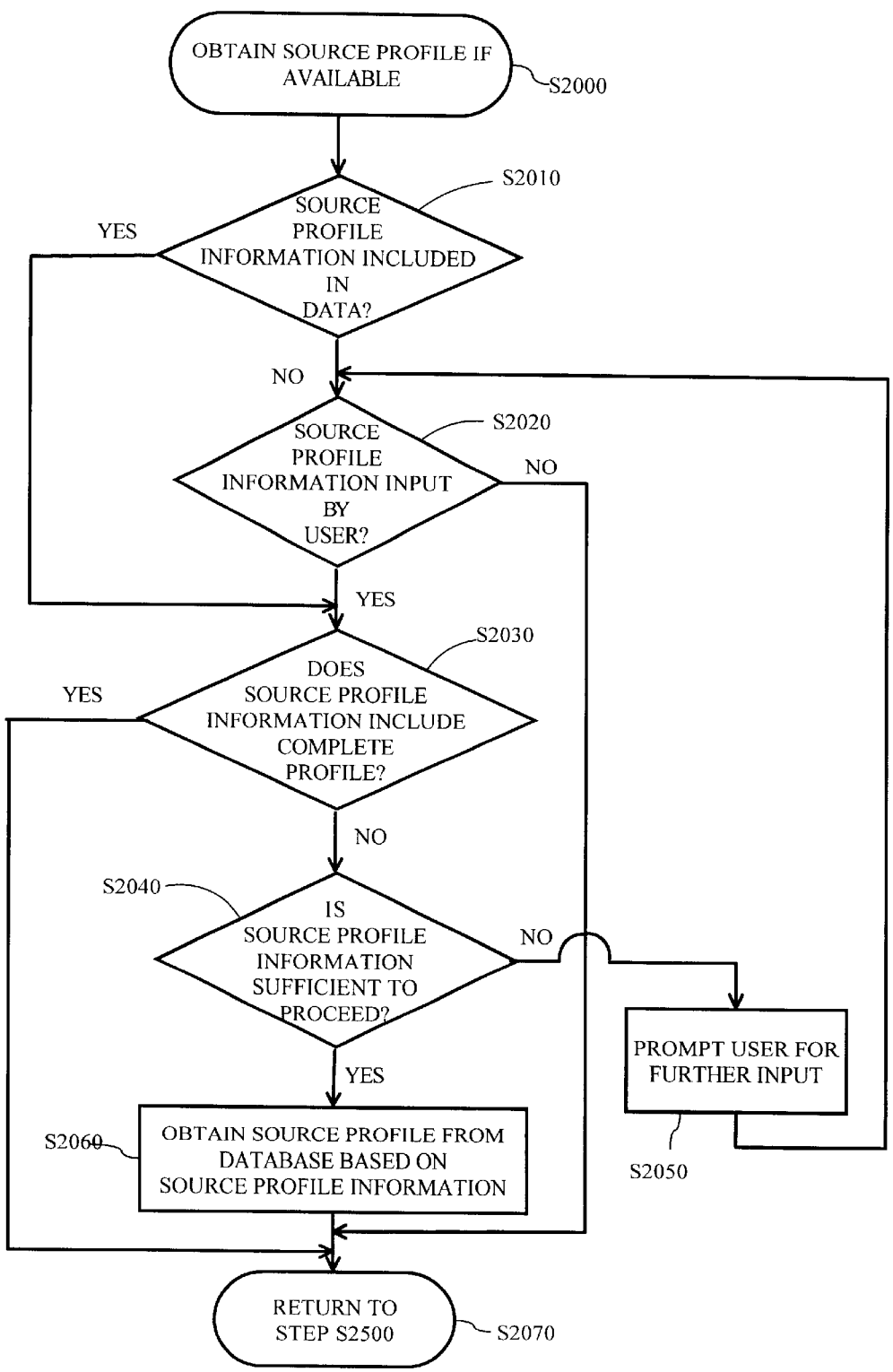
FIG. 5 is a flowchart outlining one exemplary embodiment of a method for obtaining a source profile according to this invention.

FIG. 5 is a flowchart outlining one exemplary embodiment of a method for performing the obtaining of the source profile of step S2000 of FIG. 4. Beginning in step S2000, the method continues to step S2010, where a determination is made whether source profile information is included in the incoming data. If such source profile information is included, the method jumps directly to step S2030. Otherwise, the method continues to step S2020.

In step S2020, a determination is made whether source profile information has been input by a user. If source profile information has been input, the method continues to step S2030. Otherwise, the method jumps to step S2070. In other words, if no source profile information is present in the data itself or by separate user input, the method concludes that no source profile information is available and returns to step S2500 of FIG. 4.

In step S2030, a determination is made whether the source profile information includes a complete source profile. If a complete profile is included, the method jumps to step S2070, and returns to step S2500 of FIG. 4. Otherwise, the method continues to step S2040.

In step S2040, a determination is made whether the source profile information is sufficient to proceed, e.g., whether the source profile information includes a pointer or other information sufficient to obtain a source profile. If the source profile information is sufficient, the method jumps to step S2060. Otherwise, the method continues to step S2050.

In step S2060, the complete source profile is obtained from a database or other data storage device or software structure based on a pointer or other appropriate source profile information. Control then continues to step S2070.

In contrast, in step S2050, a situation occurs in which some source profile information is available, but the available source profile information is insufficient. This situation may occur, for example, if the user has made an error in inputting source profile information. The method could proceed from this point based on a default setting. However, since the user has input (or attempted to input) some source profile information, as determined previously in step S2020, it is assumed that the user is aware of information relevant to the source profile, and desires to input this information. Therefore, the user is prompted for further input. This prompt may, for example, be in the form of a text message or pop-up window displaying a message to the effect of "The source profile information is insufficient. Please input source profile information again." The user is thus given a further opportunity to input the source profile information. Control then returns to step S2020.

Step S2020 is then repeated. If the user inputs more information, the method repeats the appropriate steps following step S2020 to determine if the newly input source profile information is sufficient. If the user does not input more information, e.g., if a specified time period elapses without user input or if the user selects on option to proceed using defaults, the process jumps to step S2070 and returns to step S2500 of FIG. 4.

Figure 6:
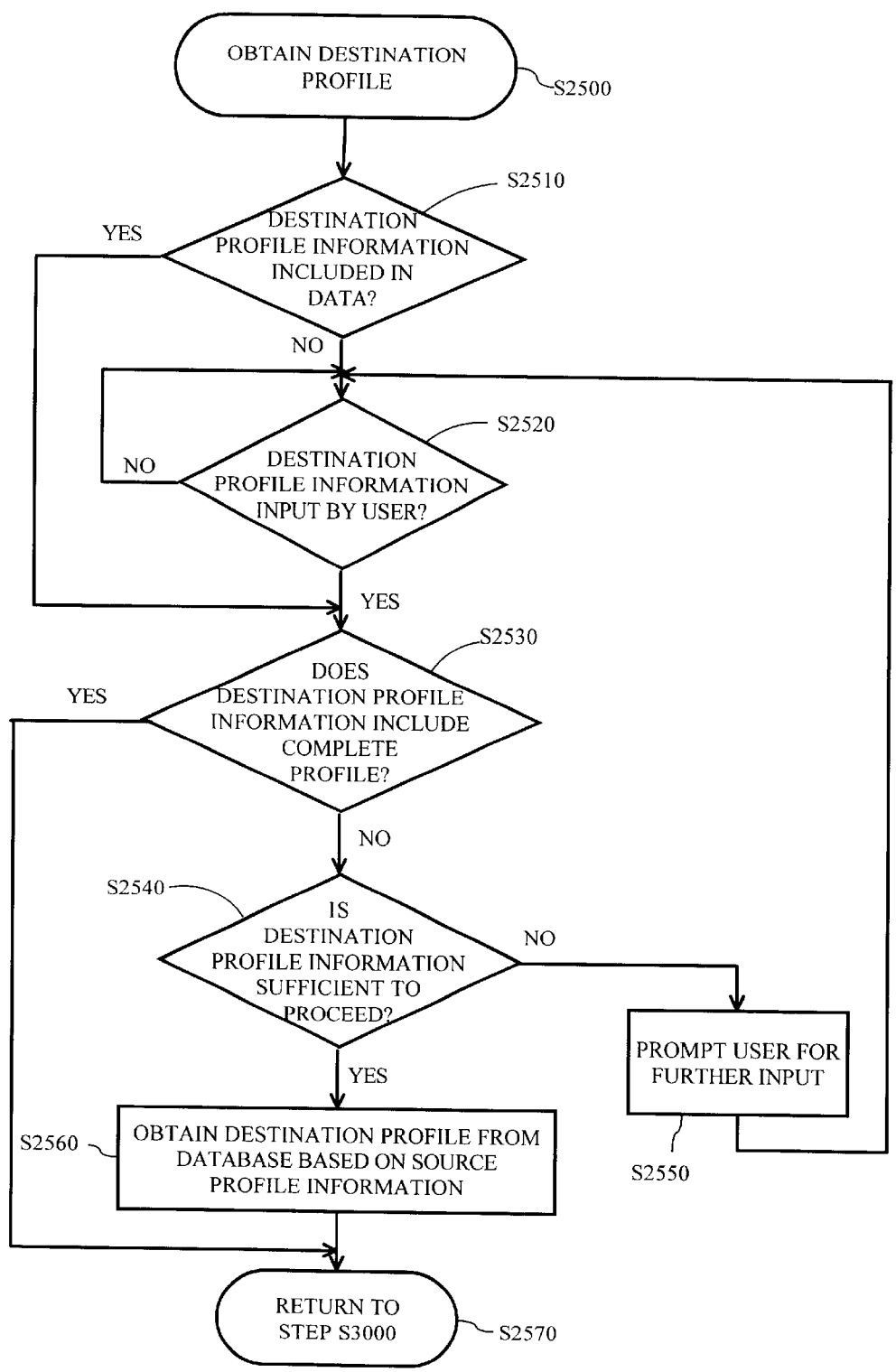
FIG. 6 is a flowchart outlining one exemplary embodiment of a method for obtaining a destination profile according to this invention.

FIG. 6 is a flowchart outlining one exemplary embodiment of a method for performing the obtaining of the destination profile of step S2500 of FIG. 4. Beginning in step S2500, the method continues to step S2510, where a determination is made whether destination profile information is included in the incoming data. The destination profile information may include a direct indication of a destination or destination profile, or other information that is sufficient to allow the system to choose an appropriate destination or destination profile. If the destination profile information is included, the method jumps to step S2530. Otherwise, the method continues to step S2520.

In step S2520, a determination is made whether destination profile information has been input by a user. If destination profile information has been input, the method continues to step S2530. Otherwise, the method repeats step S2520 until profile information is input by the user. In other words, since the method cannot be completed without a destination profile being identified, or with at least some information available from which to choose an appropriate destination or destination profile, the method cannot proceed further than step S2520 until destination profile information is available.

In step S2530, a determination is made whether the source profile information includes a complete destination profile. If a complete destination profile is included, the method jumps to step S2570 and returns to step S3000 of FIG. 4. Otherwise, the method continues to step S2540.

In step S2540, a determination is made whether the destination profile information is sufficient to proceed, e.g., whether the destination profile information includes a pointer or other information sufficient to obtain a destination profile. If the destination profile information is sufficient, the method jumps to step S2560. Otherwise, the method continues to step S2550.

In step S2560, the complete destination profile is obtained from a database or other data storage device or software structure based on a pointer or other appropriate destination profile information. Then, in step S2570, the method returns to step S3000.

In step S2550, a situation occurs in which some destination profile information is available, but the available destination profile information is insufficient. This situation may occur, for example, if the user has made an error in inputting destination profile information, or when a custom marking substrate has been installed without the association of a destination profile. Therefore, the method prompts the user for further input. This prompt may, for example, be in the form of a text message or pop-up window displaying a message to the effect of "The destination profile information is insufficient. Please input destination profile information again." The user is thus given a further opportunity to input the necessary destination profile information.

It should be appreciated that in many cases, the destination profile is automatically obtained merely by the act of a user designating a particular output device or destination.

It should also be appreciated that the steps of the above-described methods are not limited to the order shown in FIGS. 4–6. For example, since fast data conversion paths do not require a complete source profile or a complete destination profile, the steps of retrieving the full profiles may be deferred until after the determination has been made as to whether a fast data conversion path is available.

The data processor 200 shown in FIG. 2 is, in various exemplary embodiments, implemented on a programmed general purpose computer. However, the data processor 200 can also be implemented on a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing the flowcharts shown in FIGS. 4–6 can be used to implement the data processor 200. Moreover, the data processor 200 can be implemented as software executing on a programmed general purpose computer, a special purpose computer, a microprocessor or the like. In this case, the data processor 200 can be implemented as a routine embedded in a printer driver, as a resource residing on a server, or the like. The data processor 200 can also be implemented by physically incorporating it into a software and/or hardware system, such as the hardware and software systems of a printer or a digital photocopier.

While the invention has been described in conjunction with the specific embodiments described above, many equivalent alternatives, modifications and variations may become apparent to those skilled in the art once given this disclosure. Accordingly, the exemplary embodiments of the invention as set forth above are considered to be illustrative and not limiting. Various changes to the described embodiments may be made without departing from the spirit and scope of the invention.

What is claimed is:

1. A method for converting data from a source format to a destination format, comprising:
    accessing a lookup table that directly converts data in a first format to data in a second format;
    receiving data;
    identifying a source format of the data from among a plurality of possible source formats;
    identifying a destination format for the data from among a plurality of possible destination formats;
    determining whether the source format of the data is the first format and whether the destination format for the data is the second format; and
    converting the data from the first format directly to the second format using the lookup table when the source format of the data is the first format and the destination format for the data is the second format.

2. The method of claim 1, further comprising:
    converting, when at least one of (a) the source format is not the first format and (b) the destination format is not the second format, the data in the source format to data in an intermediate format; and
    converting the data in the intermediate format to data in the destination format.

3. The method of claim 2, wherein the intermediate format is a device-independent color space.

4. The method of claim 3, wherein the device-independent color space is a profile connection space.

5. The method of claim 1, wherein the first format is defined by at least a device-dependent color space.

6. The method of claim 1, wherein the second format is defined by a set of output parameters including at least a device-dependent color space.

7. The method of claim 6, wherein the set of output parameters further includes at least one of a marking substrate color, a marking substrate weight, a marking substrate coating, a marking substrate opacity, a marking substrate white point, an emulation intent, and a rendering intent.

8. The method of claim 1, further comprising:
    determining whether color adjustment is to be performed to the received data;
    converting, when color adjustment is to be performed, the data in the source format to data in an intermediate format; and
    converting the data in the intermediate format to data in the destination format.

9. A method for converting data from a source format to a destination format, comprising:
    accessing a lookup table that directly converts data in a first format to data in a second format;
    receiving data;
    identifying a source format of the data from among a plurality of possible source formats;
    identifying a destination format for the data from among a plurality of possible destination formats;
    determining whether color adjustment is to be performed to the data;
    determining whether the source format of the data is the first format and whether the destination format for the data is the second format; and
    converting the data from the first format directly to the second format using the lookup table when (a) the source format of the data is the first format and the destination format for the data is the second format and (b) color adjustment is not to be performed.

10. The method of claim 9, further comprising:
    converting the data to an intermediate format when at least one of (a) the source format is not the first format, (b) the destination format is not the second format, and (c) color adjustment is to be performed; and
    converting the data in the intermediate format to data in the destination format.

11. A data processor, comprising a controller that:
    identifies a source format of data from among a plurality of possible source formats;
    identifies a destination format for the data from among a plurality of possible destination formats;
    determines whether a lookup table is available that directly converts data in a first format to data in a second format; and
    converts the data from the first format directly to the second format using the lookup table when the source format of the data is the first format and the destination format for the data is the second format.

12. The data processor of claim 11, wherein the controller:
    converts, when at least one of (a) the source format is not the first format and (b) the destination format is not the second format, the data in the source format to data in an intermediate format; and
    converts the data in the intermediate format to data in the destination format.

13. The data processor of claim 12, wherein the intermediate format is a device-independent color space.

14. The data processor of claim 13, wherein the device-independent color space is Profile Connection Space.

15. The data processor of claim 11, wherein the first format is defined by at least a device-dependent color space.

16. The data processor of claim 11, wherein the second format is defined by a set of output parameters including at least a device-dependent color space.

17. The data processor of claim 16, wherein the set of output parameters further includes at least one of: a marking substrate color, a marking substrate weight, a marking substrate coating, a marking substrate opacity, a marking substrate white point, an emulation intent, and a rendering intent.

18. The data processor of claim 11, wherein the controller:
   determines whether color adjustment is to be performed to the data;
   converts, when color adjustment is to be performed, the data in the source format to data in an intermediate format; and
   converts the data in the intermediate format to data in the destination format.

19. A marking system incorporating the data processor of claim 11 and at least one data destination.

20. A digital copier incorporating the data processor of claim 11, at least one data destination and at least one data source.

21. A data processing system incorporating the data processor of claim 11 and one of (a) at least one data source and a plurality of data destinations and (b) a plurality of data sources and at least one data destination.

22. A recording medium on which is recorded a program that executes the identifying, determining and converting steps of claim 1.

23. The method of claim 1, wherein the source format and the destination format are both device-dependent.

24. The method of claim 9, wherein the source format and the destination format are both device-dependent.

25. The data processor of claim 11, wherein the source format and the destination format are both device-dependent.

* * * * *